US010184722B1

(12) United States Patent
Ingle

(10) Patent No.: US 10,184,722 B1
(45) Date of Patent: Jan. 22, 2019

(54) MULTI-ZONE HEATING OVEN WITH A PLURALITY OF HEATING ZONES HAVING INDIVIDUALLY CONTROLLED TEMPERATURE HUMIDITY

(71) Applicant: Kinestral Technologies, Inc., South San Francisco, CA (US)

(72) Inventor: Nicholas J. C. Ingle, South San Francisco, CA (US)

(73) Assignee: Kinestral Technologies, Inc., Hayward, CA (US)

( * ) Notice: Subject to any disclaimer, the term of this patent is extended or adjusted under 35 U.S.C. 154(b) by 336 days.

(21) Appl. No.: 15/078,880

(22) Filed: Mar. 23, 2016

(51) Int. Cl.
*A47J 27/16* (2006.01)
*F27B 9/02* (2006.01)
*F26B 15/00* (2006.01)

(52) U.S. Cl.
CPC .............. *F27B 9/028* (2013.01); *F26B 15/00* (2013.01)

(58) Field of Classification Search
CPC ............. A21B 1/245; F27B 9/06; F27D 11/00
USPC ....... 99/331, 339, 386, 443 C; 219/388, 391, 219/400, 401
See application file for complete search history.

(56) References Cited

U.S. PATENT DOCUMENTS 2,256,003 A * 9/1941 Patterson ................. A21B 1/48 432/133
4,094,627 A * 6/1978 Milton, Jr. ................ F27B 9/10 34/242
6,410,066 B1 * 6/2002 Weng ...................... A23L 3/003 426/231
2006/0163238 A1 * 7/2006 Miller .................... A21B 1/245 219/388

* cited by examiner

*Primary Examiner* — Thien S Tran
(74) *Attorney, Agent, or Firm* — Womble Bond Dickinson (US) LLP

(57) ABSTRACT

A multi-zone heating oven is disclosed. The multi-zone heating oven includes a plurality of in-line heating chambers, a conveyor system configured to convey objects between and into each chamber of the plurality of in-line heating chambers and a supply line for each of the plurality of in-line heating chambers. In addition, the multi-zone heating oven includes an exhaust system. The humidity in each chamber is set individually. Changes in the temperature and humidity that an object is subjected to are controlled by moving the object through the plurality of chambers.

20 Claims, 7 Drawing Sheets

MULTI-ZONE HEATING OVEN WITH A PLURALITY OF HEATING ZONES HAVING INDIVIDUALLY CONTROLLED TEMPERATURE HUMIDITY

BACKGROUND

Industrial ovens are devices with heating chambers that are used in a variety of industrial applications, including drying, curing, or baking components, parts or final products. Industrial ovens can be used for large or small volume applications. Components, parts or final products can be processed in batches or continuously with a conveyor line, and using a variety of temperature ranges, sizes and configurations.

Industrial ovens can be used in many different industrial processes, including chemical processing, food production, and electronics fabrication, where circuit boards are run through a conveyor oven to attach surface mount components.

A type of industrial oven is a humidity chamber or oven. Many humidity ovens can control humidity and temperature within their chambers. A conventional use for humidity ovens is environmental testing. As a part of such use, an important concern is with achieving critical endpoint humidity levels as opposed to controlling each humidity level (that an object is subjected to) from the beginning to the end of a process. Some conventional humidity ovens control humidity levels in a single chamber. In such cases, relative humidity data is used to adjust temperature and water levels over time. Other conventional industrial heating chambers, such as surface mount electronics reflow ovens (used for soldering) only provide temperature control. Commercial ovens, such as Smit™, BTU™, etc., provide high temperatures but do not provide humidity control.

As such, conventional humidity ovens have functional and design limitations that effect how they can be used. More specifically, their functional and design limitations can render them unsuitable for some advanced or specialized industrial applications that require the capacity to provide processing that strictly adheres to a specific temperature and humidity profile. Consequently, conventional humidity ovens can be unsatisfactory for use in some advanced or specialized industrial applications.

SUMMARY

Some conventional humidity ovens have functional and design limitations that render them unsuitable for some advanced or specialized industrial applications that require the capacity to provide temperature and humidity processing that adheres to a specific and/or application specific processing profile. A multi-zone humidity oven is disclosed that addresses the shortcomings of the aforementioned conventional ovens. However, the claimed embodiments are not limited to implementations that address any or all of the aforementioned shortcomings. The aforementioned multi-zone humidity oven includes a plurality of in-line heating chambers, a conveyor system configured to convey objects between and into each chamber of the plurality of in-line heating chambers and an air or gas supply line for each of the plurality of in-line heating chambers. In addition, the multi-zone heating oven includes an exhaust system. The temperature and humidity in each chamber is set individually. Changes in the temperature and humidity that an object is subjected to are controlled by moving the object through the plurality of chambers. The multi-zone humidity oven is designed to heat objects according to a temperature and humidity profile that is tailored to drive chemical processes that require strict adherence to specific heating profiles.

BRIEF DESCRIPTION OF THE DRAWINGS

The described embodiments and the advantages thereof may best be understood by reference to the following description taken in conjunction with the accompanying drawings in which.

DETAILED DESCRIPTION

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to “one embodiment” or “an embodiment” are intended to indicate that a particular feature, structure, or characteristic described in connection with the embodiment is included in at least one embodiment of the present invention. The appearance of the phrase “in one embodiment” in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

As used herein a temperature-humidity profile is intended to refer to a determined series of temperature-humidity levels that an object that undergoes heat processing can be subjected to in order to achieve a desired result. As used herein a temperature-humidity pathway is intended to refer to the actual series of temperature-humidity levels that an object that undergoes heat processing is subjected to.

Figure 1:
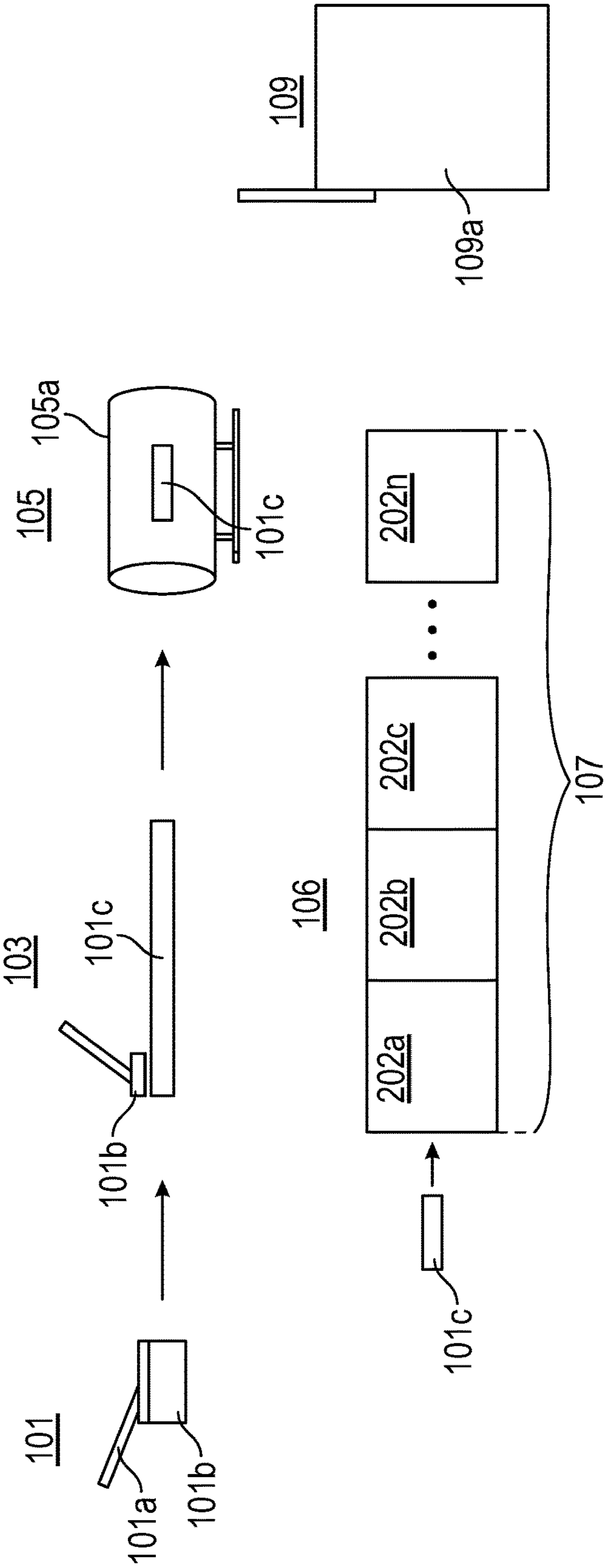
FIG. 1 shows a typical operating environment of a multi-zone humidity oven according to one embodiment.

FIG. 1 shows a typical operating environment of a multi-zone humidity oven according to one embodiment. In particular, the typical operating environment of a multi-zone humidity oven is a multipart industrial product assembly and manufacturing setting. In one embodiment, as part of the setting, the multi-zone heating oven can heat a coated glass substrate (or other component, part or finished product) in accordance with a temperature and humidity profile that drives chemical processes with respect to the coated glass substrate such that a desired result is achieved. In particular, the multi-zone humidity oven can reliably provide a critical temperature and humidity profile for the coated glass substrate being treated as a part of a manufacturing process. FIG. 1 shows a multipart industrial product assembly and manufacturing setting that includes solution loading stage 101, film applying stage 103, drying stage 105, heating stage 106 and calcination stage 109. Also shown in FIG. 1, are precursors 101*a*, die 101*b*, glass substrate 101*c*, vacuum chamber 105*a* and humidity oven 107.

Referring to FIG. 1, in loading stage 101 a solution made from chemical precursors 101*a* is loaded into die 101*b* to prepare for the application of the solution to the surface of glass substrate 101*c*. Next, in film applying stage 103, die 101*b* is moved across the surface of glass substrate 101*c* such that a thin layer of solution 101*a* is placed onto the surface of glass substrate 101*c*. Thereafter, in drying stage 105, glass substrate 101*c* is brought into vacuum chamber 105*a* for drying purposes (to remove solvent). Finally, in heating stage 106, glass substrate 101*c* is loaded into humidity oven 107 to initiate a desired chemical reaction. In one embodiment, as described above, coated glass substrate 101*c* is placed into humidity oven 107 where the coated glass substrate is subjected to a multi-zone heating process that has a specific temperature and humidity profile/pathway that drives chemical reactions with respect to the coated glass substrate 101*a*.

Humidity oven 107 is electrically heated and designed for heating glass substrates 101*c* in an atmosphere with an adjustable relative humidity. In one embodiment, in humidity oven 107, heat transfer is accomplished through convection. In one embodiment, humidity oven 107 can consist of a plurality of oven chambers 202*a-n*, with independent temperature and humidity controls and settings (described herein with reference to FIG. 2) for each chamber. In one embodiment, the plurality of chambers constitutes a plurality of thermal zones. In one embodiment, humidity oven 107 can include five such thermal zones. In other embodiments, humidity oven 107 can include a different number of such thermal zones. In one embodiment, in operation, the sections or thermal zones are separated by air or gas "curtains" (not shown in FIG. 1 but described with reference to FIGS. 3A and 3B). In one embodiment, the air or gas curtains are generated such that abrupt changes in humidity and temperature for typical profiles can be avoided. In addition, the air or gas curtains operate to minimize cross contamination between the thermal and humidity zones, as well as minimize the potential for condensation. In one embodiment, humidity oven 107 can be equipped with ports for gas detection. In other embodiments, humidity oven 107 can be equipped with other types of mechanisms for gas detection. Accordingly, as regards multi-zone heating phase 106, humidity oven 107 is configured to reliably provide the temperature and humidity pathway (change in temperature and humidity as a function of time) for coated glass substrate 106 that produces the desired result.

Referring again to FIG. 1, after multi-zone heating phase 106, glass substrate 101*c* can be placed into calcination furnace 109*a* to complete the chemical reaction. The result is glass with a surface film having the right material and chemistry. It should be appreciated that while a glass substrate is discussed in the embodiments, this is not meant to be limiting as the humidity oven may be utilized for any suitable substrate including plastic substrates.

Figure 2:
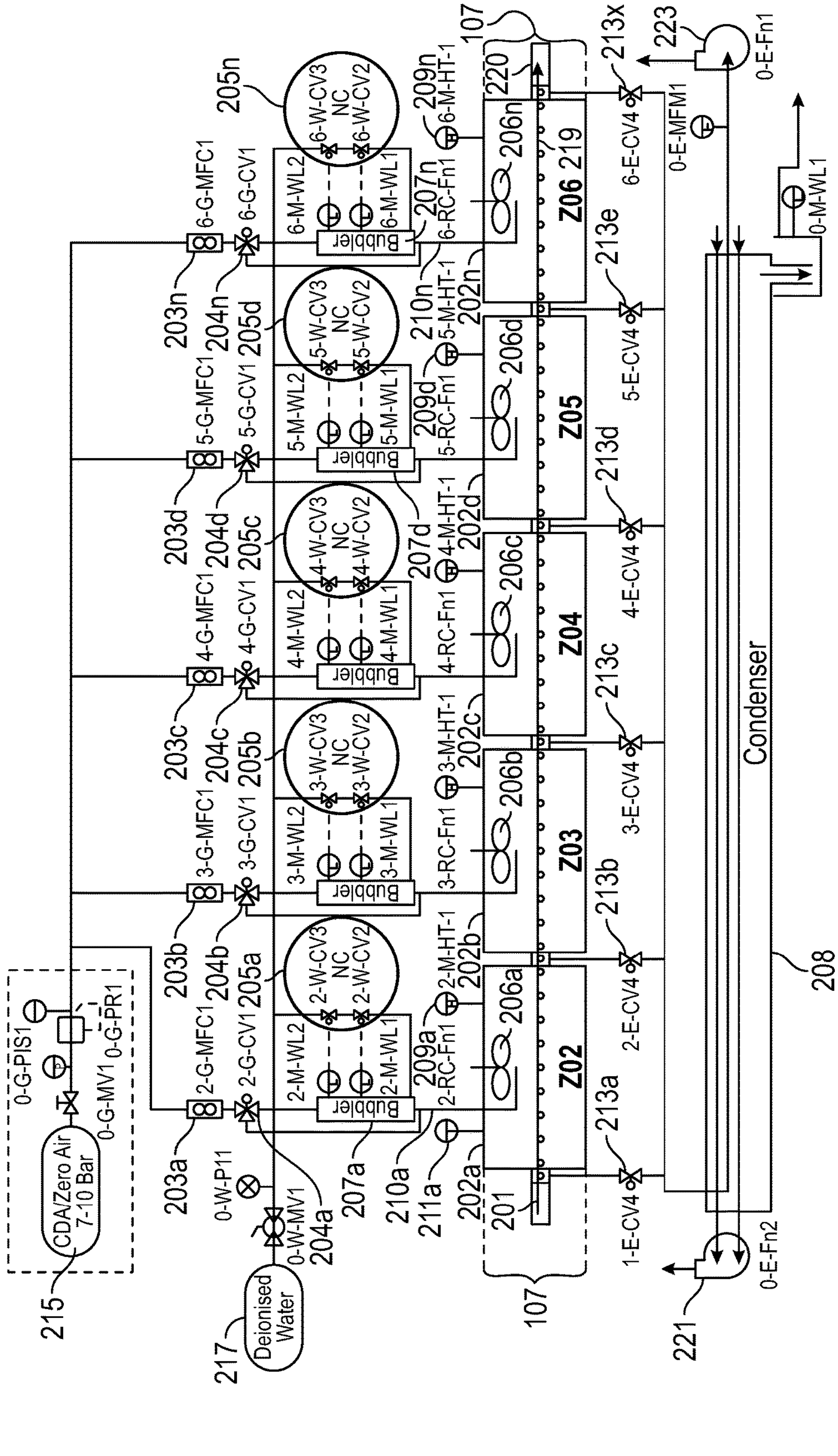
FIG. 2 shows exemplary components of an in-line humidity oven according to one embodiment.

FIG. 2 shows exemplary components of an in-line humidity oven 107 according to one embodiment. The components of in-line humidity oven 107 are configured to support the provision of a temperature-humidity profile for heating coated glass substrates (e.g., or any other suitable component, part or finished product) according to a temperature-humidity profile that drives desired chemical reactions in a solution that is placed onto the surface of the glass substrate such that a surface film having the desired material and chemistry is obtained. FIG. 2 shows loading compartment 201, oven chambers 202*a-n*, mass flow controllers 203*a-n*, air or gas check valves 204*a-n*, water check valves 205*a-n*, fans 206*a-n*, bubblers 207*a-n*, condenser 208, relative humidity sensors 209*a-n*, temperature sensors 211*a-n*, exhaust check valves 213*a-x*, air supply (dry air) 215, water supply 217, rollers 219, condenser blower 221 and extraction blower 223.

Referring to FIG. 2, loading compartment 201 is the compartment into which an object that is to be heated (e.g., coated glass substrate) is initially placed. In one embodiment, loading compartment 201 is a load lock device. In one embodiment, when the object to be heated is placed into loading compartment 201, loading compartment 201 is locked, and its pressure is adjusted, to be equal to the pressure inside first oven chamber 202*a* in some embodiments. A door between loading compartment 201 and first oven chamber 202*a* is then opened to allow the object to be heated into first oven chamber 202*a*. When the pressure in loading compartment 201 and first oven chamber 202*a* has been equalized, the object to be heated is allowed to be transported from loading compartment 201 into first oven chamber 202*a*. The above operations ensure that air is not forced, by differences in pressure between loading compartment 201 and first oven chamber 202*a*, into first oven chamber 202*a*, and from first oven chamber 202*a* into the rest of the oven chambers, 202*b-n* of humidity oven 107. In one embodiment, the pressure, temperature and humidity environment of loading compartment 201 is set to atmospheric pressure, room temperature and zero percent humidity. In other embodiments other pressure, temperature and humidity environments can be used. In one embodiment, objects can be loaded into loading compartment 201 manually or automatically (e.g., with the use of an end effector or robot).

Oven chambers 202*a-n* are the compartments of humidity oven 107 where an object is held as it is being subjected to predetermined temperature and humidity conditions. In one embodiment, oven chambers 202*a-n* hold the object that is being subjected to predetermined temperature and humidity conditions for a predetermined period of time. In one embodiment, the processing that is done in each oven chamber 202*a*-202*n* of humidity oven 107 constitutes a single processing stage, of a multistage temperature and humidity sensitive heating process, that involves processing in each of the respective chambers of the humidity oven 107. In one embodiment, the pressure in oven chambers 202*a-n* is equalized such that air is not forced, by pressure differences between chambers 202*a-n*, from one chamber to the next. The pressure regime between the adjacent chambers may take on any suitable scheme and are not limited to the regimes described herein. For example, the pressures between the chambers can increase or decrease with each successive chamber. In one embodiment, the pressure in chambers 202*a-n* is set at atmospheric pressure however, the pressure in chambers 202*a-n* can be set to other pressures. The temperature and humidity in each chamber of chambers 202*a-n* is set based on a predetermined profile for the heating process to be executed. In an exemplary process, each chamber of chambers 202*a-n* is configured to maintain stable temperature and humidity levels that can be distinct from stable temperature and humidity levels that are maintained in the other chambers of chambers 202*a-n*. Moreover, the temperature and humidity levels for each chamber of chambers 202*a-n* are independently controlled. In particular, with regard to each chamber of chambers 202*a-n*, there are separate temperature and humidity controlling components. In operation, oven chambers 202*a-n* are separated by air or gas curtains that are formed by air or gas extraction points (air or gas curtains are described with reference to FIGS. 3A and 3B). In an embodiment, the gas may be an inert gas such as nitrogen. The air or gas extraction points direct air or gas from an area between chambers 202*a-n*, that is located adjacent to the outside walls of the main heating orifices of chambers 202*a-n*, back into the main heating orifices of chambers 202*a-n*. In some embodiments, extraction of gas between zones is the main extraction of gas from the entire system. Gas may also be extracted at the edge of each zone, and that gas is recycled back into the main heating orifices. Air or gas curtains operate as a significant component of the air or gas recirculation system of humidity oven 107. It should be appreciated that air or gas curtains prevent the movement of air from one heating zone to another (if air or gas curtain were not present air from one heating zone having a certain water content could be driven into a second heating zone where air having lower water content is present). Additionally, the design of the air or gas curtains is such that abrupt changes in humidity and temperature are avoided for typical profiles. In some embodiments, the air or gas curtains can be utilized to step up the temperature or step down the temperature of a substrate upon transfer to a next chamber to avoid any condensation from occurring.

Mass flow controllers 203*a-n* control the mix of wet air or gas and heated dry air or gas that is supplied to oven chambers 202*a-n*. In an embodiment, the gas may be an inert gas such as nitrogen. The mix of wet and dry air or gas determines the temperature and humidity that is established in chambers 202*a-n*. In one embodiment, mass flow controllers 203*a-n* control the mix of wet air and dry air by adjusting the relative amounts of wet air and dry air that are delivered to the oven chambers 202*a-n* (e.g., the ratio of water to air or vice versa). In one embodiment, the mix of wet air and dry air can be based on the temperature-humidity profile that has been determined to be proper for a particular process. Moreover, adjustments to this mix can be made based on data that is supplied from sensors such as relative humidity sensors 209*a-n*. In one embodiment, mass flow controllers 203*a-n* control the mix of wet air and dry air by controlling air or gas check valves 204*a-n* to effect the desired mix of wet air and dry air (the mix that establishes the desired temperature and humidity) as is described below. The desired mix of wet air and dry air is delivered to oven chambers 202*a-n* via oven chamber supply lines 210*a-n*. The mix of wet air and dry air that is delivered to oven chambers 202*a-n* by oven chamber supply lines 210*a-n* is heated to the proper temperature and provides the heating for oven chambers 202*a-n*. However, each chamber also includes infrared (IR) heaters (shown in FIGS. 3A and 3B) that contribute heat and helps to maintain the temperature within oven chambers 202*a-n* at a constant level.

Air or gas check valves 204*a-n* are switching valves that are controlled to effect the flow of a desired mix of wet air and dry air into oven chambers 202*a-n*. Air or gas check valves 204*a-n* can be toggled between wet air that is generated in bubblers 207*a-n* and dry air that is supplied from air supply 215 to achieve a desired mix of wet air and dry air that is delivered to oven chambers 202*a-n*. Water check valves 205*a-n* facilitate the flow of water from water supply component 217 into bubblers 207*a-n*.

Bubblers 207*a-n* receive air from air supply component 215 and water from water supply component 217. Bubblers 207*a-n* generate wet air that can be mixed with dry air to produce air that has the right air-water ratio. In one embodiment, the air-water ratio can be set by the action of valves such as air or gas check valves 204*a-n* that are described herein. In one embodiment, the air-water ratio is set based on the temperature-humidity profile that is used. In one embodiment, adjustments to the air-water ratio can be made in response to the detection of humidity and temperature levels in chambers 202*a-n* by sensors 209*a-n*. For example, detection of humidity levels that are too low can cause adjustments that raise humidity levels, and, detection of humidity levels that are too high can cause adjustments that lower humidity levels. In one embodiment, the temperature of the water in bubblers 207*a-n* can be set to a temperature that produces air that has a desired humidity.

Fans 206*a-n* recirculate air within humidity oven 107. As a part of the recirculation of air within humidity oven 107, fans 206*a-n* mix the moist air that is delivered to chambers 202*a-n* with the air that is already in chambers 202*a-n*. Upon achieving the desired temperature and humidity (e.g., moisture) within chambers 202*a*-n, the recirculation of air by fans 206*a-n* maintains a uniform temperature therein. In addition, fans 206*a-n* spread and help dilute gases that are emitted from heated objects.

Relative humidity sensors 209*a-n* measure the moisture content of the thermal environment within humidity oven 107. Objects that undergo thermal processes interact with moisture in the environment. This moisture can come from the object itself and can affect finished product quality. Relative humidity sensors 209*a-n* provide humidity information that is used to maintain the proper humidity level inside of the oven chambers 202*a-n* to which they are attached.

Temperature sensor 211*a* senses the temperature inside the chamber 202*a* of humidity oven 107. Temperature sensor 211*a* provides temperature information that is used to maintain the proper temperature inside of the oven chamber 202*a*. Each oven chamber 202*a-n* may include a temperature sensor, however for illustrative purposes only chamber 202*a* is illustrated with a temperature sensor.

Exhaust valves 213*a-x* extract air or gas from oven chambers 202*a-n* of humidity oven 107. In one embodiment, exhaust valves 213*a-x* help to maintain the pressure inside oven chambers 202*a-n* at a constant level by extracting the same amount of air or gas from oven chambers 202*a-n* that is delivered to oven chambers 202*a-n*. The exhaust valves 213*a-x* can be electronically controlled.

Condenser 208 cools the air that is directed out of chambers 202*a-n*. Condenser 208 condenses water out of the air such that the amount of dry air that remains can be measured. This information is used to maintain a balance between the air or gas that is delivered to oven chambers 202*a-n* and the air or gas that is extracted from oven chambers 202*a-n*. In one embodiment, condenser 208 is coupled to condenser blower 221 and extraction blower 223 (described herein below).

Condenser blower 221 is coupled to condenser 208 and keeps the condenser cool. Extraction blower 223 draws process gas through condenser 208. This measurement is used by a controller of the humidity oven 107 to determine the amount of dry air that should be provided to respective oven chambers 202*a-n* in order to maintain a stable temperature and humidity level in that chamber of humidity oven 107. A proportional-integral-derivative controller (PID controller) may be utilized to control the humidity/temperature/pressure conditions within the respective chambers as well as other environmental variables within the chambers in some embodiments.

Unloading compartment 220 may be used to dry and/or cool the object that has been heated according to a profile by humidity oven 107 (e.g., a coated glass substrate). The environment inside unloading compartment 220 is set to a temperature and humidity that is suitable to dry the object. In one embodiment, once dry, the object can be provided to the next phase of a product assembly and manufacturing process.

Figure 3A:
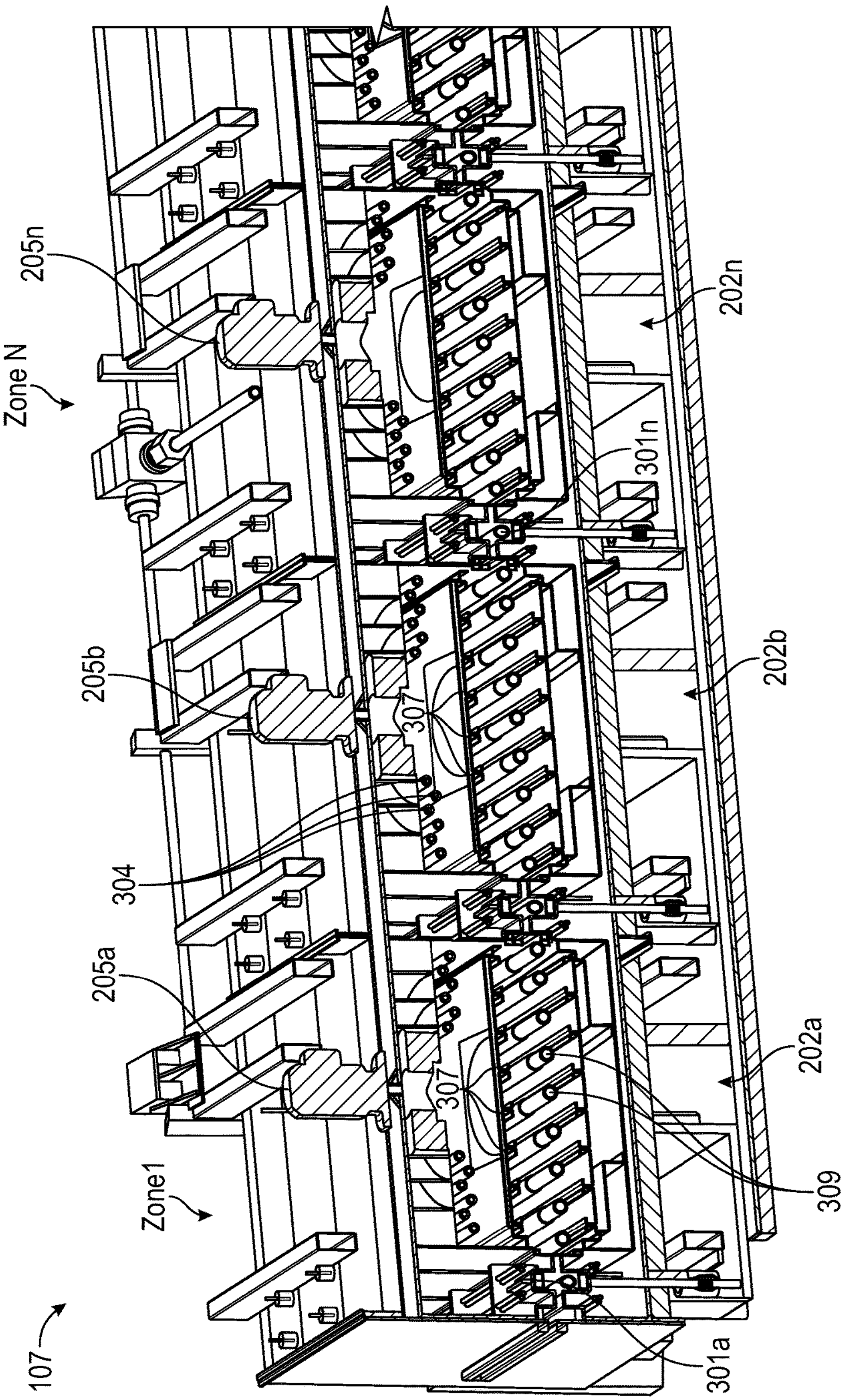
FIG. 3A illustrates air recirculation in an in-line multi-zone humidity oven and air or gas curtain formation according to one embodiment.

FIG. 3A illustrates air recirculation and air or gas curtain formation in an in-line multi-zone humidity oven 107 according to one embodiment. In one embodiment, the interior of humidity oven 107 maintains a proper temperature and humidity profile between the various chambers through a controller regulating the air or gas supply and exhaust systems described herein. Referring to FIG. 3A, as described above, each thermal zone, zones 1-N, can have its own air or gas supply line (e.g., 210*a-n* in FIG. 2). Air or gas curtains 301*a-n* are adjacent to each zone. Exhaust of the supplied air or gas is established from the zones and/or between the zones. In one embodiment, each of the chambers 202*a-n* are equipped with at least one central recirculation fan 205*a-n* and with at least one central water evaporating system in order to produce humid clean dry air (CDA). The relative humidity of zones 1-N can be set and controlled by mass flow controllers (by mixing dry and humid air or gas as described herein). The supply and exhaust of air or gas to and from each of the individual zones 1-N is made to be constant in order to minimize humidity cross-contamination between zones 1-N. As each of zones 1-N has its own supply systems (air or gas and water), the humidity of each of zones 1-N can be set individually and independently of each other. Heat tracing can be applied to the supply lines in order to prevent condensation. Each of zones 1-N can be equipped with a humidity sensor. Multi-zone humidity oven 107 is a closed loop control system, such as through a PID controller in some embodiments.

Figure 3B:
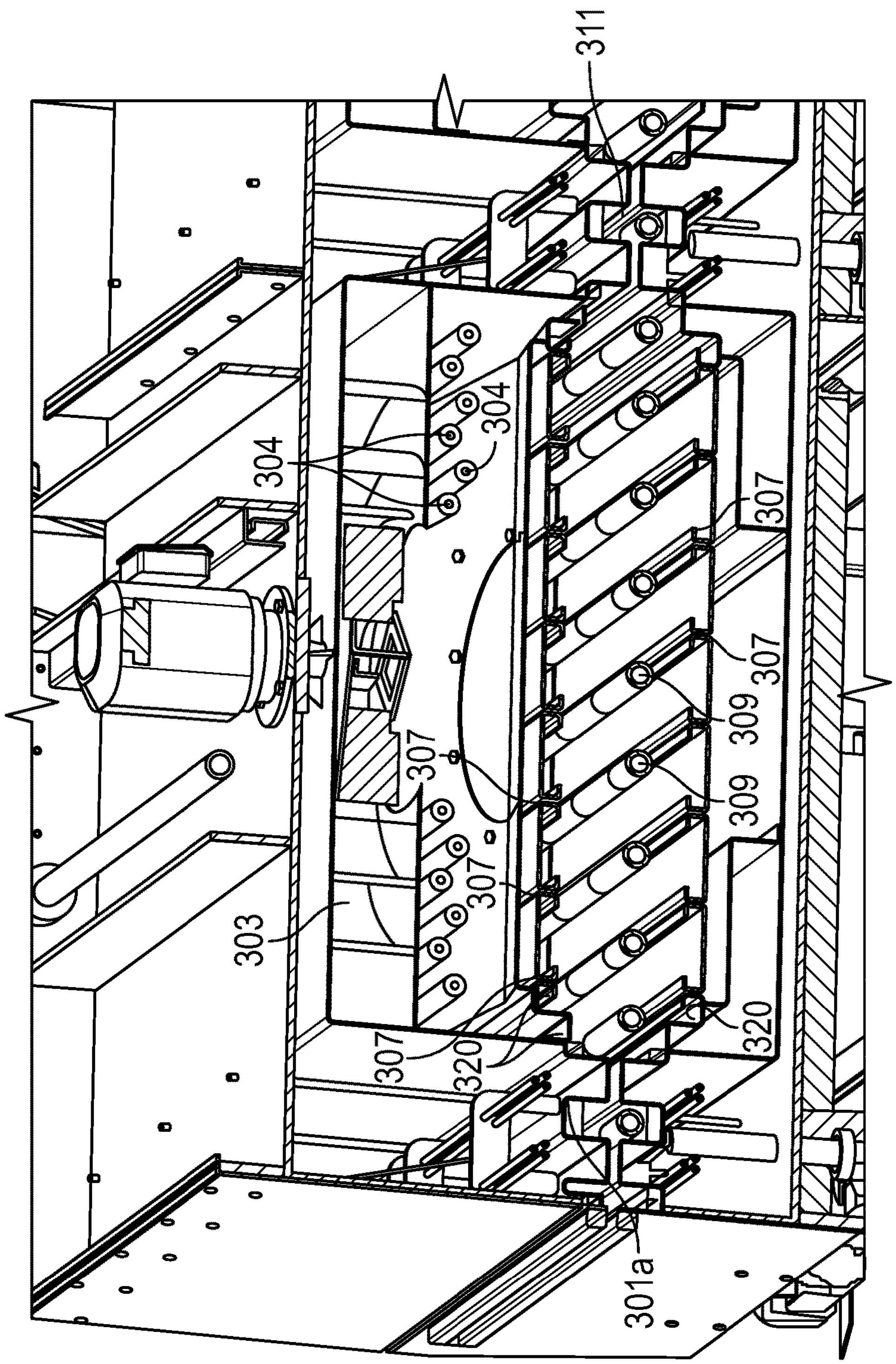
FIG. 3B illustrates air flow within an oven chamber according to one embodiment.

FIG. 3B illustrates the components that are significant for air recirculation in an in-line multi-zone humidity oven chamber 202*a*. Moist air that is delivered to chamber 202*a* is injected into a duct and is drawn over IR heaters 304 (which add some heat to the circulating air or gas), up through the recirculation fan 205*a*, mixed thoroughly in the baffles 303, then driven out of nozzles 307. Nozzles 307 direct the air downward toward an object being heated (e.g., coated glass substrate) that lies on rollers 309. Rollers 309 move the object back and forth so that air from each nozzle 307 is directed toward and contributes to the heating of each part of the surface of the object. It should be appreciated that some of the rollers 309 may be powered while some rollers are not powered. In addition, the powered rollers can be driven to move a substrate in either direction through the various chamber zones. Some of the moist air moved by fan 205*a* is directed downwards to the lower part of the chamber along the inner sides of the chamber to be then driven out of nozzles 307. Nozzles 307 direct the air upward toward a bottom of the object being heated (e.g., coated glass substrate) that lies on rollers 309. To complete the recirculation loop, moist air is drawn from vents 320 at the front and rear of chamber 202*a*, into a duct where it is mixed with the moist air being delivered to the chamber. In some embodiments recirculation of the air is optional. Air or gas curtains 301*a-n* in FIG. 3A) isolate thermal zones 1-N and transition object temperature for the next thermal zone. The air or gas curtains may be located within the slot region 311 and can be directed downward and/or upward toward respective surfaces of the substrate. It should be appreciated that the embodiments apply heat to the substrate in order to heat the substrate such that condensation in the next oven chamber is prevented, or, after heating phases are completed by cooling the object down before removing it from the humidity oven. In one embodiment, IR heaters can be positioned above and below slot region 311 to contribute heating to the air or gas curtains. It should be appreciated that the air flow may be laminar in nature.

Figure 4:
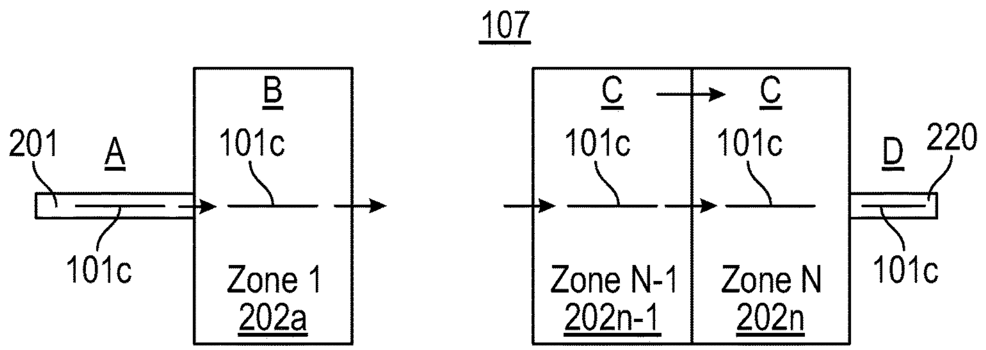
FIG. 4 illustrates the operation of a humidity oven according to one embodiment.

FIG. 4 illustrates the operation of humidity oven 107 according to one embodiment. Although, the operation of humidity oven 107 is described with reference to FIG. 4 with respect to the heating of a coated glass substrate 107*a*, humidity oven 107 can be used more generally in heating applications involving any other object, component, part or finished product that is suitable for heat processing by humidity oven 107. The operations shown herein, which relate to the operation of humidity oven 107 are only exemplary. It should be appreciated that other operations not illustrated in FIG. 4 can be performed in accordance with one embodiment.

At A, coated glass substrate 101*c* is placed into loading compartment 201, and onto a conveyor system for transport into a first thermal zone (e.g., Zone 1). In one embodiment, coated glass substrate 101*c* can be oriented with its long side leading on the conveyor. In other embodiments, coated glass substrate 101*c* can be oriented in other ways. In one embodiment, humidity oven 107 can be equipped with a roller type conveyor system. In other embodiments, other type conveyor systems can be used. In one embodiment, the rollers can be made from stainless steel. In other embodiments, the rollers can be made from other materials. In one embodiment, coated glass substrates 101*c* that are placed into loading compartment 201 are not placed in direct contact with the roller surface as the roller may be coated or covered with another material.

At B, after being transported into oven chamber 202*a*, coated glass substrate 101*c* is heated to a predetermined humidity and temperature. Oven chamber 202*a* is designed to heat the top and bottom surfaces of coated glass substrate 101*c* uniformly. In one embodiment, coated glass substrate 101*c* is heated for a predetermined period of time before being transported to the next thermal zone.

At C, coated glass substrate 101*c* is transported from the first chamber into successive chambers of in-line humidity oven 107 to complete heating according to a predetermined heating profile. In particular, coated glass substrate 101*c* is heated in each chamber in a predetermined humidity and temperature environment according to a predetermined profile, or schedule of heating operations, that drive chemical processes on coated glass substrate 101*c* such that desired results are achieved (see discussion made with reference to FIG. 1A). The thermal path that glass substrate 101*c* takes when it is moved from one oven chamber to the next is designed to ensure that the temperature of the substrate is sufficiently high so as not to cause condensation in the receiving oven chamber. In particular, the path is designed to ensure that when coated glass substrate 101*c* enters an oven chamber 202*a-n*, after completing treatment in the previous oven chamber, the temperature of coated glass substrate 101*c* is above the dew point of the environment in the receiving oven chamber. In one embodiment, as described herein, air or gas curtains, located between oven chambers 202*a-n*, apply heated air to the surface or surfaces of glass substrate 101*c*, as it moves from one chamber to the next, in order to heat glass substrate 101*c*, and transition glass substrate 101*c* (ensure that its temperature is appropriate for the next phase), such that condensation in the receiving oven chamber is prevented. At D, substrate 101*c* is transported into unloading compartment 220 to dry.

Figure 5:
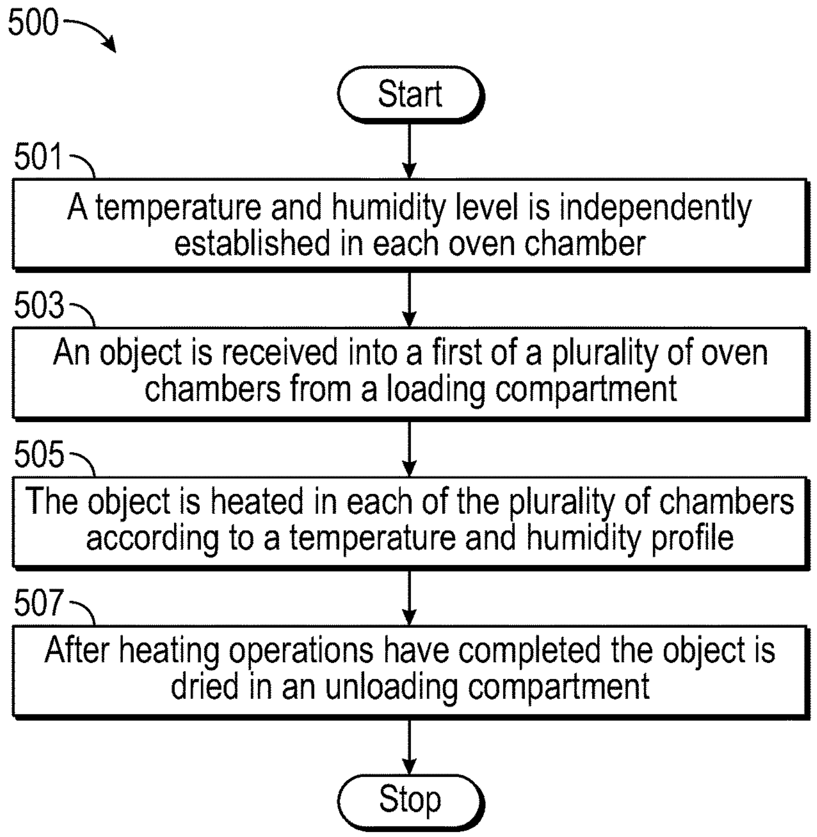
FIG. 5 shows a flowchart of the steps performed in a method for multi-zone heating in an in-line humidity oven according to one embodiment.

FIG. 5 shows a flowchart 500 of the steps performed in a method for multi-zone heating in an in-line humidity oven according to one embodiment. Although specific steps are disclosed in the flowcharts, such steps are exemplary. That is the present embodiment is well suited to performing various other steps or variations of the steps recited in the flowchart.

Referring to FIG. 5, at 501 a temperature and a humidity level is independently established in each of a plurality of oven chambers of the in-line humidity oven. As described herein, the temperature and humidity levels can be established through, in part, the operation of mass flow controllers as described herein.

At 503, an object (e.g., a coated glass substrate), component, part or finished product is received into a first of the plurality of chambers. In one embodiment, the object can be brought into the first of the plurality of oven chambers from a loading compartment.

At 505, the object is heated in each of the plurality of oven chambers according to a predetermined humidity and profile. The object is moved from one oven chamber to a next when the predetermined heating period for that oven chamber has elapsed. It should be appreciated that a chemical reaction may take place under the conditions provided for in the oven chambers as part of the processing for the coating applied to the substrate. In some embodiments, the object is an electrochromic window as manufactured by the assignee. The object may be moved between chambers through the roller/conveying system and the slots adjoining the chambers as described above. At 507, after the heating of the object has completed in the last of the plurality of oven chambers, the object is placed into an unloading compartment and dried.

Figure 6A:
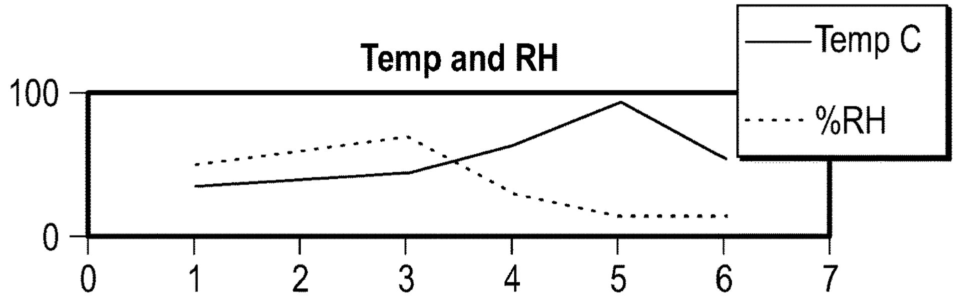
FIG. 6A is a graph of data from a first temperature and relative humidity profile test of an exemplary humidity oven related to temperature and humidity.
Figure 6B:
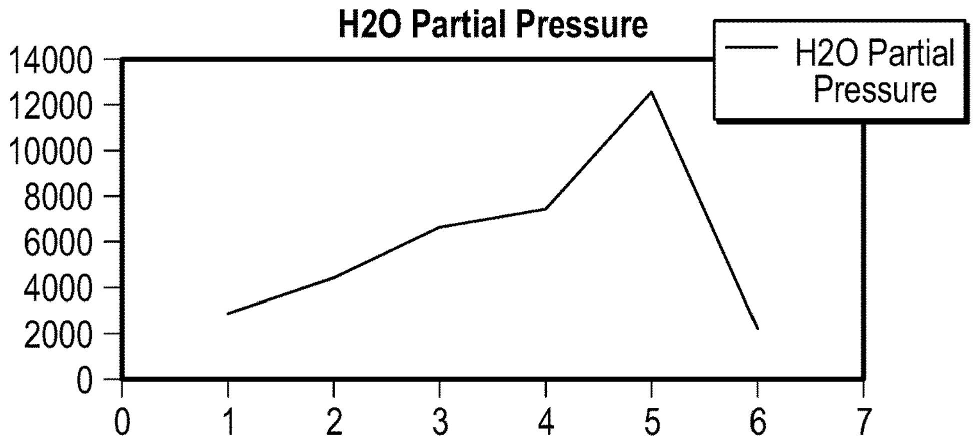
FIG. 6B is a graph of data from a first temperature and relative humidity profile test of an exemplary humidity oven related to H2O partial pressure.
Figure 6C:
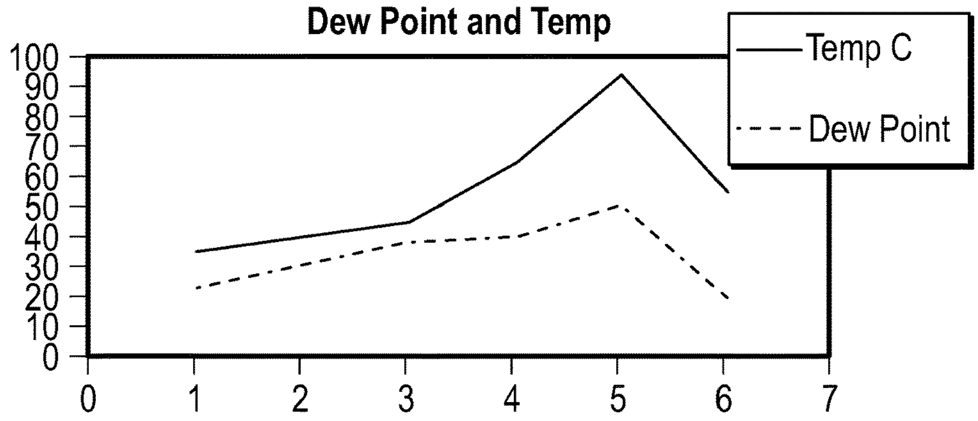
FIG. 6C is a graph of data from a first temperature and relative humidity profile test of an exemplary humidity oven related to dew point.
Figure 7A:
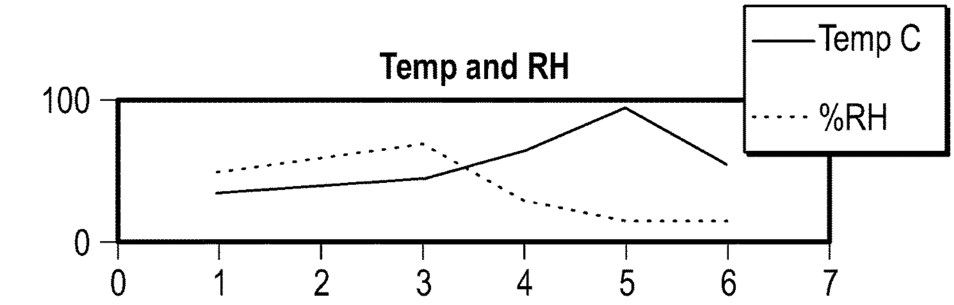
FIG. 7A is a graph of data from a second temperature and relative humidity profile test of an exemplary humidity oven related to temperature and humidity.
Figure 7B:
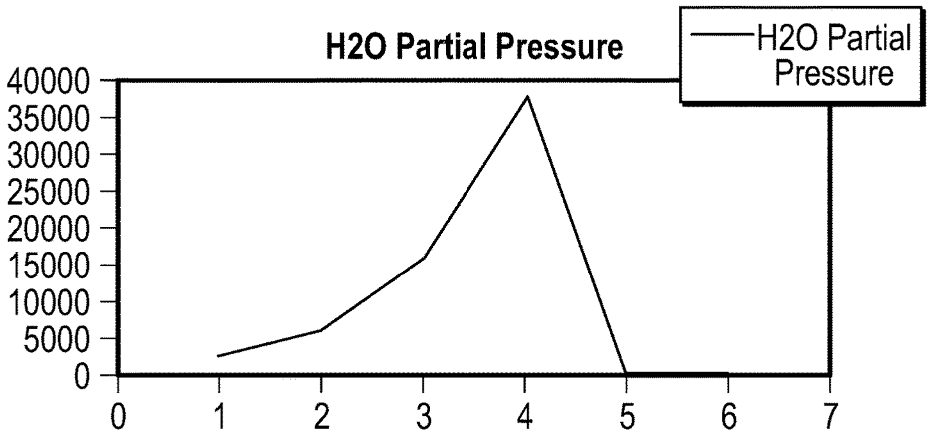
FIG. 7B is a graph of data from a second temperature and relative humidity profile test of an exemplary humidity oven related to H2O partial pressure.
Figure 7C:
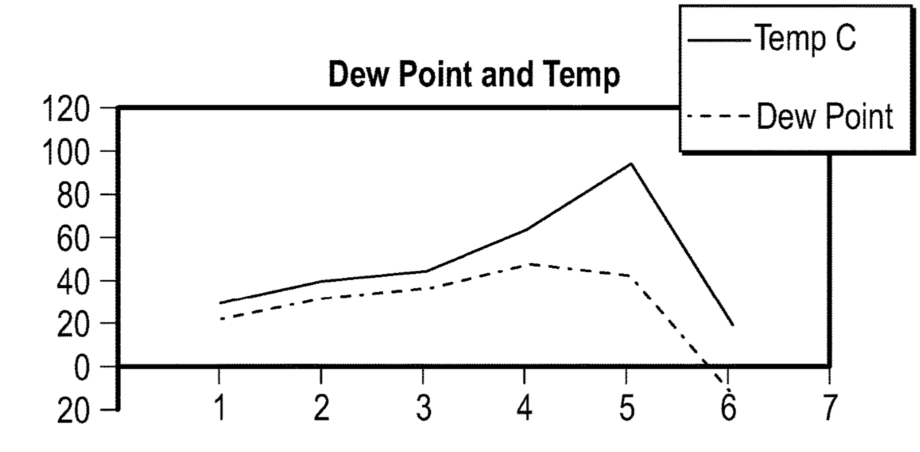
FIG. 7C is a graph of data from a second temperature and relative humidity profile test of an exemplary humidity oven related to dew point.

FIGS. 6A, 6B and 6C are graphs of data from a first temperature and relative humidity profile test of an exemplary humidity oven (e.g., 107 in FIG. 1) and show plots of temperature and humidity, Water partial pressure and dew point respectively. FIGS. 7A, 7B and 7C are graphs of data from a second temperature and relative humidity profile test of an exemplary humidity oven (e.g., 107 in FIG. 1) and show plots of temperature and humidity, water partial pressure and dew point respectively. Tables I and II below provide the data upon which the graphs are based. Table I provides data from the first temperature and relative humidity profile test and Table II provides data from the second temperature and relative humidity profile test. It should be appreciated that the embodiments provide controlling temperature and humidity in a plurality of zones of an apparatus where each zone has a constant temperature and humidity. In addition, air curtains are used to isolate zones and to transition substrate temperature for next step in the processes (either preventing condensation by applying heated air or cooling down before removing from oven). The control of the humidity and temperature within each zone is achieved through controlling air flow and the heating of the air flow within the chamber as well as the introduction or removal of moisture into the air flow. In some embodiments, the air flow supplied to the surface of the substrate within the chamber is laminar and thus avoids turbulence. FIGS. 6A-7C and the tables below illustrate the operation of the humidity oven to provide a temperature over the travel of the substrate between the zones that is always greater than a dew point temperature. Thus, as the temperature and relative humidity change throughout the zones (see FIGS. 6A and 7A), the temperature within each zone is maintained to prevent any condensation from occurring (see FIGS. 6C and 7C). Consequently, a reaction requiring these conditions, e.g., a coating for an electrochromic window, may be handled through the apparatus described herein.

TABLE 1

TEMPERATURE AND RELATIVE HUMIDITY PROFILE TEST DATA

| Zone | Total Time In Zone | Temp C. | % RH | Saturation pressure | H2O Partial Pressure | Dew Point |
|---|---|---|---|---|---|---|
| 0 | | 20 | 30 | | | 23.01119563 |
| 1 | 5 | 35 | 50 | F5608.917343 | 2804.458672 | 30.73544226 |
| 2 | 10 | 40 | 60 | 7358.308037 | 4414.984822 | 38.23040124 |
| 3 | 15 | 45 | 70 | 9559.659183 | 6691.761428 | 40.34241381 |
| 4 | 20 | 65 | 30 | 24946.64835 | 7483.994504 | 50.69789359 |
| 5 | 25 | 95 | 15 | 84476.94707 | 12671.54206 | 20.16246192 |
| 6 | 30 | 55 | 15 | 15701.77465 | 2355.266197 | |

TABLE II

TEMPERATURE AND RELATIVE HUMIDITY PROFILE TEST DATA

| Zone | Total Time In Zone | Temp C. | % RH | Saturation pressure | H2O Partial Pressure | Dew Point |
|---|---|---|---|---|---|---|
| 0 | | 20 | 30 | | | 22.69480153 |
| 1 | 5 | 30 | 65 | 4231.599101 | 2750.539415 | 32.14601565 |
| 2 | 10 | 40 | 65 | 9559.659183 | 6213.778469 | 36.86438639 |
| 3 | 15 | 45 | 65 | 24946.64835 | 16215.32143 | 48.1845027 |
| 4 | 20 | 65 | 45 | 84476.94707 | 38014.62618 | 42.71904376 |
| 5 | 25 | 95 | 10 | 2329.533968 | 232.9533968 | −12.49858419 |
| 6 | 30 | 20 | 10 | 605.5695429 | 60.55695429 | |

Exemplary embodiments control change in humidity by moving an object (e.g., a coated glass substrate) through multiple zones (chambers), where each zone has a constant temperature and humidity. Air curtains are used to isolate zones and to transition object temperature for next operations in the process (either preventing condensation by applying heated air to the object or by cooling object down before removing from oven). The air curtains may be generated by the extraction of gas, rather than the introduction of gas in some embodiments. In some embodiments, the air curtains may be generated from compressed air or some other inert gas. The number of zones can be defined by process needs. In one embodiment, because of system design, a change of humidity or temperature in one zone does not significantly influence the measured humidity or temperature in neighboring zones. Because of system design, the motion of objects form one zone to the next does not cause a significantly change in relative humidity and temperature. The embodiments can accommodate the heating, soaking and cooling of glass substrates or other objects in an atmosphere with an adjustable relative humidity. In one embodiment, heat transfer is established by convection, but this is not meant to be limiting as other heat transfer mechanism may be integrated with the embodiments. Both top and bottom surfaces of the substrate or other objects may be heated uniformly as the flow of air may be provided from both the top and bottom of each zone. In some embodiments, each zone is equipped with a plurality of heating elements and one or more recirculation fans.

In one embodiment, the humidity oven, as described herein, consists of a plurality of sections with independent temperature and humidity settings. These sections are separated by air or gas curtains as described above. The modular design of the oven allows the addition or deletion of sections to the system. In one embodiment, humidity oven is equipped with a roller type conveyor system. In cases where coated glass substrates are the objects that are being heated, the coated glass substrates can be oriented long side leading and can be manually loaded onto the rollers of the entrance table and transported automatically into the first thermal zone. In one embodiment, the rollers can be made from stainless steel with rings composed of a chemically inert material to support the coated glass substrates. In other embodiments rollers can be made from other types of materials. In one embodiment, the humidity oven can include a stainless steel tunnel that has hydrophobic insulation material and stainless steel cladding on the inside. In other embodiments, other material can be used to form the tunnel, insulation material, and cladding.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

What is claimed is:

1. A multi-zone heating oven, the multi-zone heating oven comprising:

a plurality of in-line heating chambers, each of the in-line heating chambers configured to recirculate air within respective heating chamber and each of the in-line heating chambers having an infrared heating element;

a conveyor system configured to convey objects between and into each chamber of the plurality of in-line heating chambers;

a supply line for each of the plurality of in-line heating chambers; and an exhaust system, wherein temperature and humidity in each chamber is set individually and changes in the humidity that an object is subjected to is controlled by movement of the object through the plurality of chambers, and wherein a pressure of adjoining in-line heating chambers is equalized during conveyance of objects between the adjoining in-line heating chambers.

2. The heating oven of claim 1 further comprising a duct system that generates a gas curtain between individual chambers.

3. The heating oven of claim 1 wherein a number of chambers is adjustable based on process requirements.

4. The heating oven of claim 1 wherein the humidity in each chamber is set based on a ratio of dry and wet air supplied to the chambers.

5. The heating oven of claim 1, further comprising a plurality of nozzles disposed in each in-line heating chamber, the plurality of nozzles directing heated air toward opposing surfaces of an object within an in-line heating chamber.

6. The heating oven of claim 1 further comprising an unloading compartment for drying the object.

7. The heating oven of claim 1 wherein a total supply and exhaust of air to and from each individual zone is constant.

8. The heating oven of claim 4 wherein the chambers comprise a humidity sensor.

9. The heating oven of claim 1 wherein exhaust is established from the chambers and between the chambers.

10. An in-line heating chamber; comprising;

a loading compartment coupled to an input port;

a conveyor system configured to convey objects within the chamber from the input port to an output port of the heating chamber;

a supply line coupled to the in-line heating chamber;

an exhaust system, wherein temperature and humidity in the in-line heating chamber is adjustable; and in-line coupling components configured to couple the in-line heating chamber to first and second other in-line heating chambers, each of the in-line heating chambers configured to recirculate air within respective heating chamber and each of the in-line heating chambers having an infrared heating element, wherein a pressure of adjoining in-line heating chambers is equalized during conveyance of objects between the adjoining in-line heating chambers.

11. The in-line heating chamber of claim 10 further comprising a duct system that generates an air curtain adjacent the in-line heating chamber.

12. The in line heating chamber of claim 10 wherein the humidity is set based on a ratio of dry air and wet air that is supplied to the in-line heating chamber.

13. The in-line heating chamber of claim 10 wherein the total supply and exhaust of air into and out of the in-line heating chamber is constant.

14. The in-line heating chamber of claim 10 further comprising a plurality of nozzles disposed in each in-line heating chamber, the plurality of nozzles directing heated air toward opposing surfaces of an object within an in-line heating chamber.

15. The in line heating claim 10 wherein exhaust is established from the in-line humidity chamber and between the in-line humidity chamber.

16. A method for multi-zone heating in an in-line humidity oven, the method comprising:

independently establishing a temperature and a humidity level in each of a plurality of heating chambers of the in-line humidity oven, each of the plurality of heating chambers configured to recirculate air within respective heating chamber and each of the plurality of heating chambers having an infrared heating element;

receiving an object into a first of the plurality of heating chambers;

heating the object in each of the plurality of chambers for a predetermined period of time, wherein the object is moved from a previous chamber to a next chamber when the predetermined period of time has elapsed, and wherein a pressure within the previous chamber and a pressure within the next chamber is equalized during movement of the object among respective chambers; and after completing heating the object in a last of the plurality of heating chambers, outputting the item.

17. The method of claim 16 further comprising a duct system that generates an air curtain between individual chambers of the plurality of heating chambers.

18. The method of claim 16 further comprising directing heated air through a plurality of nozzles, the plurality of nozzles disposed over opposing surfaces of an object within an in-line heating chamber.

19. The method of claim 16 wherein the humidity in each heating chamber is set based on a ratio of dry and wet air supplied to the heating chamber.

20. The method of claim 16 wherein the total supply and exhaust of air to and from each individual zone is constant.

* * * * *